United States Patent [19]

Infanger et al.

[11] 3,823,617
[45] July 16, 1974

[54] STEERING SYSTEM

[75] Inventors: Arthur W. Infanger, Cayuga; Alan W. Brownlie, Skaneateles, both of N.Y.

[73] Assignee: Aqua Marine Manufacturing Limited, Ontario, Canada

[22] Filed: Apr. 28, 1972

[21] Appl. No.: 248,503

[52] U.S. Cl............ 74/498, 74/393, 74/437, 114/154
[51] Int. Cl..... B63h 25/10, B62d 1/20, F16h 35/02
[58] Field of Search.......... 74/496, 480 B, 498, 487, 74/437, 393; 114/144 R; 14/154

[56] References Cited
UNITED STATES PATENTS

| | | | |
|---|---|---|---|
| 1,449,845 | 3/1923 | Taylor | 74/437 |
| 1,992,440 | 2/1935 | Parker | 74/498 |
| 2,552,572 | 5/1951 | Mikina | 74/437 X |
| 2,861,635 | 11/1958 | Orr | 74/437 X |
| 2,971,489 | 2/1961 | Loser, Jr. | 114/154 |
| 3,064,491 | 11/1962 | Bishop | 74/393 |
| 3,135,130 | 6/1964 | Bentley | 74/498 X |
| 3,500,699 | 3/1970 | Matsuda | 74/498 |

FOREIGN PATENTS OR APPLICATIONS

| | | | |
|---|---|---|---|
| 621,579 | 12/1959 | Italy | 74/498 |
| 910,509 | 5/1954 | Germany | 114/154 |

Primary Examiner—Allan D. Hermann
Attorney, Agent, or Firm—Browne, Beveridge, De Grandi & Kline

[57] ABSTRACT

A steering system particularly suitable for watercraft wherein the input is non-linearly related to the output so that when the watercraft is running on a straight course the steering is very sensitive operating at a low ratio input to output and when the watercraft is in full turn, the steering is much less sensitive operating at a high ratio input to output. Preferably, the system employs oval gears for transmitting speed from the input which may be the steering wheel or similar control member to the output which may be the rudder or an outboard motor of the craft.

9 Claims, 6 Drawing Figures

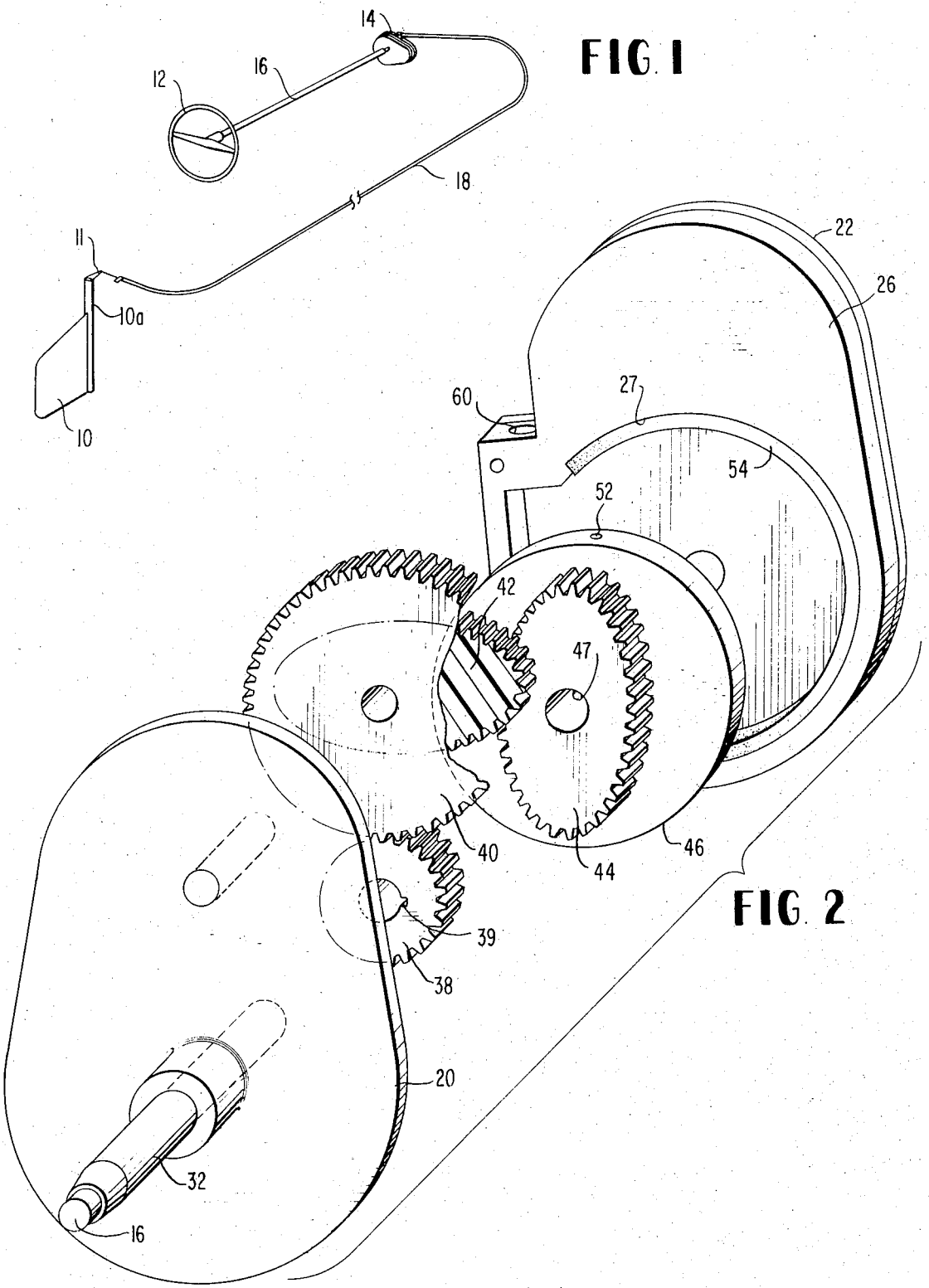

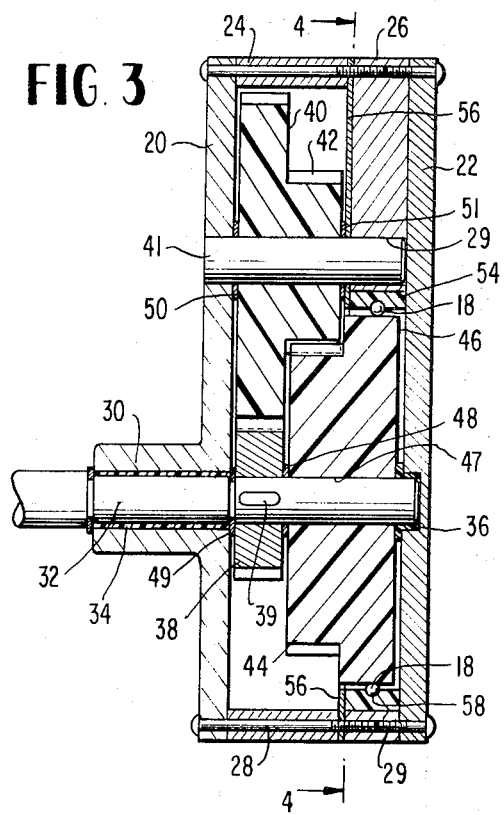
FIG. 3
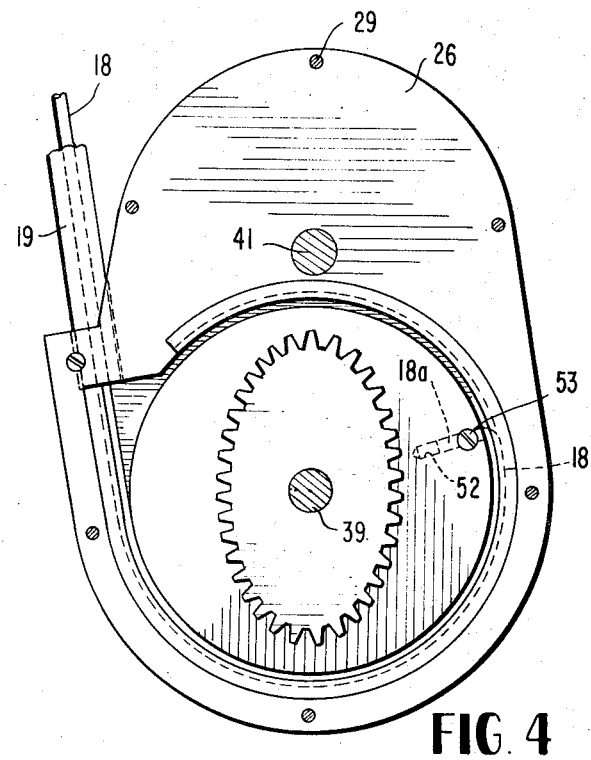
FIG. 4
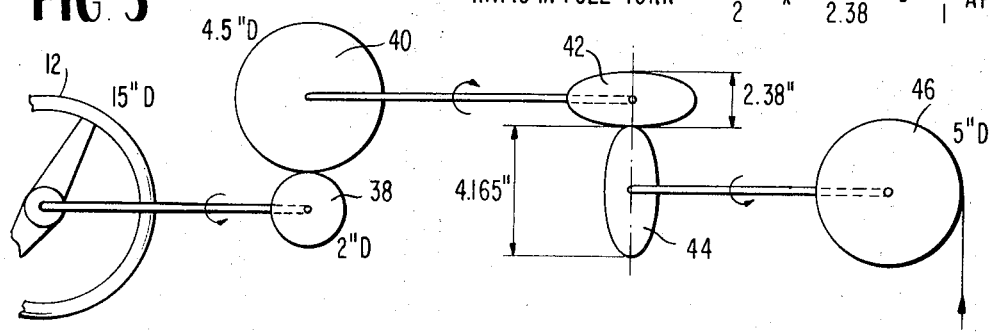
FIG. 5     RATIO IN FULL TURN: $\frac{4.5}{2} \times \frac{4.165}{2.38} = \frac{4}{1}$ APPROX.
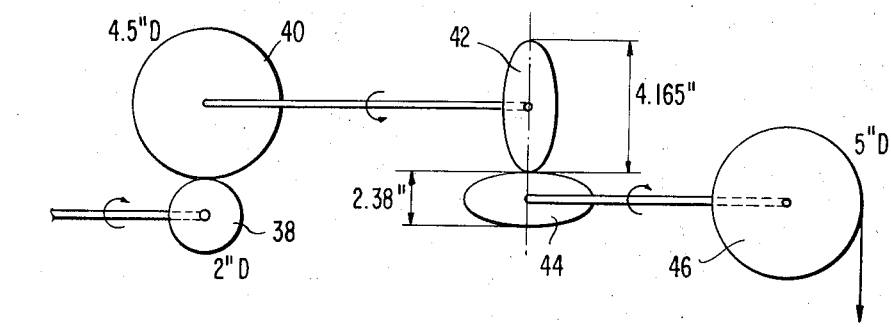
FIG. 6     RATIO IN STRAIGHT RUN: $\frac{4.5}{2} \times \frac{2.38}{4.165} = \frac{1.25}{1}$ APPROX

STEERING SYSTEM

SUMMARY OF INVENTION AND OBJECTS

The present invention relates to a novel steering system particularly suitable for watercraft although not necessarily limited thereto. More specifically, the present invention relates to a steering system incorporating a novel speed transmission between the input and output thereof.

It is an object of the present invention to provide a novel steering system wherein the ratio between the input and output thereof varies from one end of the steering cycle to the other so as to be compatible with changing conditions of the vehicle with which it is associated.

A further object of the present invention is the provision of such a steering system wherein the ratio between the input and output thereof varies non-linearly from a low ratio during which the steering is highly sensitive to a high ratio wherein the steering is much less sensitive.

A further object of the present invention is to provide a novel steering system uniquely suited for watercraft. Included herein is such a steering system which will ease and increase the maneuverability of the associated watercraft both at high and low speeds. Included herein is the provision of such a steering system wherein the ratio of input to output increases or decreases to improve maneuverability as the direction and reaction characteristics of the watercraft change so that when the watercraft reacts very quickly, the steering system is slow and conversely when the watercraft reacts slowly, the steering system is fast.

A further object of the present invention is to provide such a novel steering system for a watercraft which will reduce the total input (turns of the steering wheel or tiller) from one end of the steering cycle to the other, when compared to conventional or prior art steering systems for watercraft. This is particularly useful under high resistant conditions such as when turning the watercraft out from "hard-over." Included herein is the provision of such a steering system that will improve low speed maneuverability of the watercraft which becomes particularly useful in docking when it is necessary to reverse the direction of the water and the propeller simultaneously.

A further object of the present invention is to provide such a steering system for watercraft which will quicken the watercraft's reaction to turning at high speed on straight courses for emergency turns or sudden veering off and at the same time will reduce the tendency of the operator to oversteer in fast turns due to poor control response while the watercraft is in a skid condition. Included herein is such a steering system which will facilitate "turning-out" when the watercraft is locked in a full turn.

A further object of the present invention is to provide a novel contruction for a gear transmission included in the steering system; which transmission constructed may be relatively economically manufactured for commercial use in watercraft of various types.

The above objects are achieved in one embodiment of the invention including a steering wheel keyed to a shaft which also has fixed thereto a pinion which in turn is in mesh with a reduction gear. In accordance with the preferred form of the invention, a first oval gear is rigidly fixed (or integral) concentrically to the reduction gear to be rotated therewith in response to initial movement of the steering wheel transmitted to the reduction gear by the pinion. The second oval gear is mounted in meshing relation with the first oval gear to receive motion therefrom and to transfer it to a disk to which the second oval gear is rigidly fixed (or integral) for rotation therewith. The motion of the disk is transmitted to a rudder or other similar output of a watercraft for steering the same in response to the input from the steering wheel.

In one extreme condition of steering, the oval gears are in dead center with the major axis of one oval gear coinciding with the minor axis of the other oval gear. In the opposite extreme condition of the system, the gears are displaced annularly 90°. With this steering system, the input and output ratio varies non-linearly from a low to high ratio or vice versa. In one embodiment, the low ratio is approximately 1¼ turns in input to one turn output while the high ratio is approximately four turns input to one turn output. It is preferred that the oval gears be made from a suitable nylon or plastic material such as that registered under the trademark DELRIN.

Other objects and advantages of the present invention will become more apparent from the following detailed description of a specific embodiment taken in conjunction with the following drawings in which:

FIG. 1 is a perspective view in schematic form illustrating a steering system embodying the present invention;

FIG. 2 is an exploded perspective view of a transmission included in the steering system;

FIG. 3 is a longitudinal cross-sectional view of the transmission of FIG. 2 when assembled;

FIG. 4 is a cross-sectional view taken generally along lines 3—3 of FIG. 2;

FIG. 5 is a schematic view illustrating the position of certain gears of the transmission in one extreme position; and FIG. 6 is a schematic view similar to FIG. 5 illustrating the gears in an opposite extreme position.

DETAILED DESCRIPTION

Referring now to the drawings in detail, there is shown in FIG. 1 a steering system, embodying the invention, for a watercraft including a stern rudder 10, a steering wheel 12, and a transmission 14 transmitting motion from wheel 12 to rudder 10 non-linearly in accordance with the present invention. Operatively interconnecting steering wheel 12 and transmission 14 is a drive shaft 16 while the output of transmission 14 is operatively connected to rudder 10 by a cable 18 in conventional fashion. The end of cable 18 is fixed to an arm 11 projecting laterally from the vertical rudder shaft 10a to oscillate the same. In the preferred embodiment, the non-linear transmission from steering wheel 12 to rudder 10 is achieved through non-circular gearing such as oval or elliptical gears included in transmission 14 as will be described in greater detail. However, in other embodiments, the non-linear transmission may be achieved through linkages and cranks, or sprockets and chains, or cams and push rods.

In the specific embodiment shown, transmission 14 includes a casing having front and rear walls 20 and 22 which may be made from suitable metallic plates spaced from each other in parallel by means of an annular spacer plate 24 and a flat spacer plate 26 assembled between front and rear walls 20 and 22 by screws 28 and 29. Projecting outwardly from the lower part of front wall 20 is a hub 30 in which there is rotatably mounted an input or drive shaft 32 which extends between front and rear plates 20 and 22 as shown in FIG. 3. To reduce friction, a nylon sleeve 34 is provided about shaft 32 in hub 30, while a flanged nylon bushing is provided in rear wall 22 about shaft 32 as shown in FIG. 3. Input shaft 32 is hollow in one end to receive drive shaft 16 from the steering wheel; shaft 16 being fixed in shaft 32 to rotate together therewith upon turning of wheel 12 by the operator of the watercraft.

Fixed about shaft 32 within the casing is a pinion 38 located adjacent front wall 20 of the transmission casing. Pinion 38 may be fixed to shaft 32 in any suitable manner such as through a key 39 shown in FIGS. 2 and 3. In mesh with pinion 38 in the casing is a reduction gear 40 mounted for rotation about a shaft 41 which in turn is mounted in front casing wall 20 in alignment vertically above shaft 39 and extends across to rear casing wall 22.

The aforementioned non-linear transmission is achieved through a pair of non-circular gears 42 and 44 which may be oval or elliptical as shown. In the preferred embodiment, oval gear 42 is fixed concentrically to reduction gear 40 preferably by forming oval gear 42 and reduction gear 40 integral with each other. It is further preferred that they be formed from a strong, low friction synthetic material such as is marketed under the trademark DELRIN. Similarly, oval gear 48 is formed integrally with an output disk or wheel 46; they having a central passage 47 receiving drive shaft 32.

Motion transmitted to output wheel 46 is transmitted to cable 18 by virtue of the latter being fixed about the circumference of output wheel 46 to be movable longitudinally upon rotation of wheel 46. Cable 18 is fixed to wheel 46 in any suitable manner such as by a radial passage 52 receiving one end 18a of the cable and by a screw 53 mounted in one face of wheel 46 to be transversely movable in passage 52 into tight engagement with the end 18a of the cable. Cable 18 leads out of the transmission casing through an aperture 60 formed in a shoulder of front wall 20 as shown in FIG. 2. Preferably, a cable housing 19 is provided about cable 18 with a portion of cable housing 19 being received in passage 60. Cable 18 is maintained in proper circumferential position about output wheel 46 by means of an annular guide member 54 formed from a low friction nylon material. Guide member 54 is received in a large opening 27 in spacer plate 26. In this specific embodiment, an annular groove 58 is formed in the internal surface of guide 54 for receiving cable 18 to maintain it in the proper plane about the circumference of wheel 46, which opening receives and accommodates wheel 46. Spacer plate 26 has another but smaller opening 29 (see FIG. 3) which receives and mounts one end of shaft 41.

Guide member 54 is secured against axial movement in the casing by its one end surface abutting against rear casing wall 22 and its opposite end surface abutting against a flat spacer plate 56 which overlies the front surface of spacer plate 26 and is secured between the latter and annular spacer 24. Spacer plate 56 has a large opening similar to that of spacer 26, both of which are large enough to accommodate output wheel 46. The portions of spacer plate 56 which define its opening against the front end surface of guide 54 to maintain it in proper position against axial movement. In the specific embodiment, shims 48 and 49 are provided about shaft 32 on opposite sides of pinion 38 while similar shims 50 and 51 are provided about shaft 41 on opposite sides of reduction gear 40 and oval gear 42 as shown in FIG. 3.

In operation, upon turning steering wheel 12, drive shaft 32 will of course rotate which in turn will cause pinion 38 to rotate whereupon a reduction will occur through reduction gear 40 by virtue of its mesh with pinion 38. Rotation of reduction gear 40 is transmitted to output wheel 46 by virtue of oval gears 42 and 44 which are designed such that in one extreme position (FIG. 5) such as in a full turn, the ratio of input to output will be 4 to 1 approximately and in the opposite extreme position (FIG. 6) such as when the watercraft is in a straight run, the ratio input to output will be 1.25 to 1.0 approximately. As previously described, the rotation of wheel 46 is transmitted to cable 18 to longitudinally move the same to pivot rudder 10 to produce the steering of the craft.

In one specific embodiment, where the steering wheel has a 15 inch diameter, the pinion gear may have a 2 inch diameter, the reduction gear a 4½ inch diameter and the output wheel a 5 inch diameter. Additionally, in this embodiment, reduction gear 40 has 72 teeth with a 16 pitch, ¾ face and a 20° pitch angle. Pinion 38 has 32 teeth with a 16 pitch, ¾ face and 20° pitch angle and is also formed from any suitable material such as steel. In this embodiment, oval gears 42 and 44 will each have 30 teeth with a 9 pitch, ¾ face. In this instance, the major diameter of the oval gears would be 4.165 inches and the minor diameter 2.38 inches.

Upon viewing FIG. 5, it will be noted that in one extreme position of the steering system, the minor diameter of oval gear 42 will coincide with the major diameter of oval gear 44; and that in the opposite extreme position of steering as shown in FIG. 6, oval gears 42 and 44 will be angularly displaced 90° from their FIG. 5 position so that the major diameter of oval gear 42 coincides with the minor diameter of oval gear 44.

In addition to the advantages already enumerated above, the oval gears as employed in the present invention will produce a steering system which is statically balanced at all times, that is, in all positions of steering.

Although one specific embodiment of the invention has been shown and described above, the scope of the present invention is indicated in the appended claims.

What is claimed is:

1. A gear transmission for use in a vehicle steering system including a casing having spaced opposite front and rear walls defining a chamber, a drive shaft mounted transversely in the chamber between said walls for rotation, a pinion fixed to said drive shaft in said chamber for rotation with said drive shaft, a second shaft mounted in said chamber between said walls, a reduction gear mounted for rotation on said second shaft in mesh with said pinion, a first non-circular gear fixed concentrically to said reduction gear for rotation therewith, a second non-circular gear in mesh with said first non-circular gear and being mounted for rotation about said drive shaft in coaxially spaced relation to said pinion, an output wheel fixed concentrically to said second non-circular gear to be rotatable thereby, a cable fixed circumferentially to said output wheel to be longitudinally driven thereby upon rotation of said output wheel, a spacer plate received in said housing against said rear wall in parallel therewith, said spacer plate having a first opening receiving said second shaft and a second opening receiving said output wheel, and a bearing member received in and extending along said second opening of said spacer plate and engaged with said cable, said casing having an opening receiving a portion of said cable projecting out of said casing for connection to a member to be driven.

2. The transmission defined in claim 1 wherein said first gear is formed integral with said reduction gear and wherein said second gear is formed integral with said output wheel.

3. The transmission defined in claim 2 wherein said non-circular gears are generally oval in shape.

4. The transmission defined in claim 3 wherein said non-circular gears are identical in size, shape and gear pitch.

5. The transmission defined in claim 4 wherein said bearing member is made from low friction material, and said non-circular gears are made from material marketed under the trademark DELRIN.

6. The transmission defined in claim 1 wherein said bearing member has a groove extending along said opening thereof and receiving a portion of said cable to maintain and guide the cable in proper position.

7. The transmission defined in claim 6 wherein ther is further included a second spacer plate superimposed over said first spacer plate and having an opening receiving said output wheel, said second spacer plate having portions defining said opening thereof and abutting against said bearing member to maintain the bearing member in proper position between said second spacer plate and said rear wall of the casing.

8. A gear transmission for use in a vehicle steering system including a casing having spaced opposite front and rear walls defining a chamber, a drive shaft mounted transversely in the chamber between said walls for rotation, a pinion fixed to said drive shaft in said chamber for rotation with said drive shaft, a second shaft mounted in said chamber between said walls, a reduction gear mounted for rotation on said second shaft in mesh with said pinion, a first non-circular gear fixed concentrically to said reduction gear for rotation therewith, a second non-circular gear in mesh with said first non-circular gear and being mounted for rotation about said drive shaft in coaxially spaced relation to said pinion, an output wheel fixed concentrically to said second non-circular gear to be rotatable thereby, an elongated drive member fixed circumferentially through said output wheel to be longitudinally driven thereby upon rotation of said output wheel, and said casing having an opening receiving a portion of said elongated drive member projecting out of said casing for connection to a member to be driven thereby.

9. In a watercraft having a steering system including an input means for initiating steering, an output means for responding to the steering input means for causing a change in the direction of the watercraft and a transmission means for transmitting motion from said input means to said output means including a pair of gears in mesh with each other and having generally oval shapes with major and minor diameters: the improvement in said transmission means wherein the ratio of the motion of said input means to that transmitted to said output means is approximately four to one at the extreme full turn condition of the steering cycle, the minor diameter of the first one of said pair of gears connected to said input means coinciding with the major diameter of the second one of said pair of gears connected to said output means in said full turn condition, and the ratio of the motion of said input means to that transmitted to said output means is about 1.25 to 1 at the opposite extreme straight run condition of the steering cycle, the major diameter of said first gear coinciding with the minor diameter of said second gear in said straight run condition.

* * * * *